United States Patent
Mazzola et al.

(10) Patent No.: US 10,212,337 B2
(45) Date of Patent: *Feb. 19, 2019

(54) CAMERA AUGMENTED REALITY BASED ACTIVITY HISTORY TRACKING

(71) Applicant: Futurewei Technologies, Inc., Plano, TX (US)

(72) Inventors: Anthony J. Mazzola, Ramona, CA (US); Adam K. Zajac, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/289,698

(22) Filed: Oct. 10, 2016

(65) Prior Publication Data

US 2017/0034433 A1    Feb. 2, 2017

Related U.S. Application Data

(63) Continuation of application No. 14/212,157, filed on Mar. 14, 2014, now Pat. No. 9,503,634.

(60) Provisional application No. 61/784,667, filed on Mar. 14, 2013.

(51) Int. Cl.
  H04N 5/232    (2006.01)
  H04N 5/00     (2011.01)
  G06F 17/30    (2006.01)
  H04N 1/00     (2006.01)

(52) U.S. Cl.
  CPC ..... *H04N 5/23222* (2013.01); *H04N 1/00183* (2013.01); *H04N 5/23293* (2013.01); *G06F 17/30241* (2013.01)

(58) Field of Classification Search
  CPC ........... G06K 9/00671; H04N 5/23222; H04N 1/00183; H04N 5/23293; G06F 17/30277; G06F 17/30241
  See application file for complete search history.

(56) References Cited

U.S. PATENT DOCUMENTS

| | | | |
|---|---|---|---|
| 6,657,661 B1 | 12/2003 | Cazier | |
| 6,781,713 B1 * | 8/2004 | Gilman | ................ H04N 1/4072 358/1.9 |
| 6,806,906 B1 | 10/2004 | Soga et al. | |
| 7,920,203 B2 | 4/2011 | Kawamura | |
| 2002/0026289 A1 | 2/2002 | Kuzunuki et al. | |
| 2007/0165129 A1 | 7/2007 | Hill et al. | |

(Continued)

*Primary Examiner* — Ahmed A Berhan
(74) *Attorney, Agent, or Firm* — Slater Matsil, LLP

(57) ABSTRACT

Augmented reality can be used to display previously captured images on a viewfinder of a camera as the camera's active position nears a position from which the picture was originally taken. A histogram file may associate the original image with positional information of the camera when the image was captured. When the cameras active position nears those coordinates, a transparent version of the digital image is displayed on the viewfinder of the camera. The positional information may include a spatial location of the camera (e.g., GPS coordinates, etc.) as well as an orientation of the camera (e.g., yaw, pitch, roll, etc.). Augmented reality can be used to guide the user to configure/re-configure the camera in order to correct (or avoid) an image quality issue/defect when re-taking a picture.

20 Claims, 13 Drawing Sheets

(56) References Cited

U.S. PATENT DOCUMENTS

| | | | |
|---|---|---|---|
| 2008/0291293 A1* | 11/2008 | Kawamura | G03B 7/097 348/229.1 |
| 2010/0020970 A1 | 1/2010 | Liu et al. | |
| 2011/0098083 A1* | 4/2011 | Lablans | G03B 35/00 455/556.1 |
| 2011/0170787 A1 | 7/2011 | Gum | |
| 2011/0205377 A1 | 8/2011 | Molgaard | |
| 2012/0022546 A1 | 1/2012 | Hubschman et al. | |
| 2012/0069233 A1 | 3/2012 | Nonaka et al. | |
| 2012/0099012 A1* | 4/2012 | Ryu | H04N 5/23293 348/333.01 |
| 2013/0040700 A1 | 2/2013 | Nishikawa | |
| 2013/0050507 A1 | 2/2013 | Syed et al. | |

\* cited by examiner

CAMERA AUGMENTED REALITY BASED ACTIVITY HISTORY TRACKING

This patent application is a continuation of U.S. Non-Provisional application Ser. No. 14/212,157 filed on Mar. 14, 2014 and entitled "Camera Augmented Reality Based Activity History Tracking," which claims priority to U.S. Provisional Application No. 61/784,667, filed on Mar. 14, 2013 and entitled "Camera Augmented Reality Based Activity History Tracking," both of which are hereby incorporated by reference herein as if reproduced in their entireties.

TECHNICAL FIELD

The present invention relates to a system and method for visual media systems, and, in particular embodiments, to techniques for camera augmented reality based activity history tracking.

BACKGROUND

Various factors and/or settings can influence image quality when taking pictures or videos with modern digital cameras. Indeed, some features and settings may be adjusted by the user to enhance image quality. For instance, exposure related parameters (e.g., aperture, shutter speed, ISO speed, etc.) may be optimized for various lighting conditions. Further, a camera position can be shifted to improve image quality, as may be the case when a shadow or glare produces an image artifact. Novice users may lack the advanced knowledge/skill required to effectively manipulate camera settings and/or camera positioning to achieve optimal image quality. Accordingly, mechanisms for directing users to adjust camera settings and/or camera positioning are desired.

SUMMARY OF THE INVENTION

Technical advantages are generally achieved, by embodiments of this disclosure which describe techniques for camera augmented reality based activity history tracking.

In accordance with an embodiment, a method for operating a camera is provided. In this example, the method comprises taking a picture with a camera to capture a first digital image, and detecting a position of the camera when capturing the first digital image. The position of the camera is associated with the first digital image in a histogram file. The method further includes monitoring an active position of the camera after capturing the first digital image, and displaying the first digital image on a viewfinder of the camera when the active position of the camera is within a threshold of the position specified by the histogram file. An apparatus for performing this method is also provided.

In accordance with another embodiment, a method for correcting image quality in digital photography is provided. In this example, the method comprises taking a picture using a camera to obtain a first digital image, detecting an image quality problem in the first digital image, determining that the image quality problem is at least partially attributable to a configuration of the camera, instructing the user to reconfigure the camera via augmented reality, and re-taking the picture following re-configuration of the camera to obtain a second digital image. The image quality problem is at least partially corrected in the second digital image. An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Aspects of this disclosure use augmented reality to display previously captured images on a viewfinder of a camera as the camera's active position nears a position from which the picture was originally taken. In some embodiments, positional information (e.g., coordinates, etc.) of the camera is associated with a digital image in a histogram file, and a transparent version of the digital image is displayed on the viewfinder of the camera when the camera is returned to that position. The positional information may include a spatial location of the camera (e.g., GPS coordinates, etc.) as well as an orientation of the camera (e.g., yaw, pitch, roll, etc.). Hence, pictures captured at the same location (but different angles) may be distinguished from one another based on the camera's orientation. In some embodiments, augmented reality is used to guide the user to configure/re-configure the camera in order to correct (or avoid) an image quality issue/defect when taking/re-taking a picture. For example, an indication may be displayed on the viewfinder of the camera that instructs the user re-configure the camera. The indication may instruct the user to re-align the camera, to adjust a camera setting (e.g., to change aperture/shutter setting, etc.), or to take the picture under different lighting conditions. These and other aspects are described in greater detail below.

Figure 1:
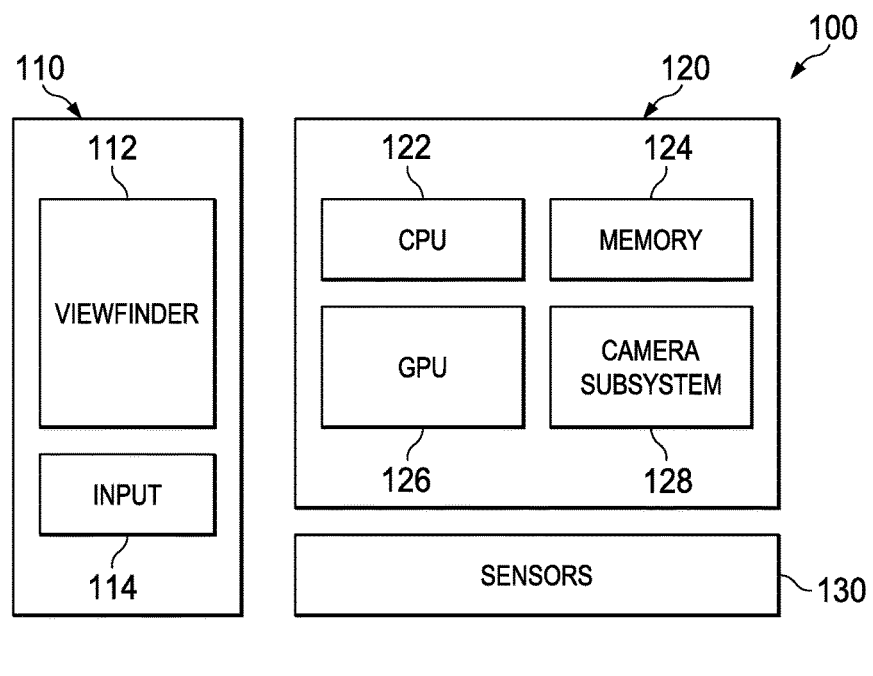
FIG. 1. illustrates a block diagram of a camera.

FIG. 1 illustrates a camera 100 comprising a user interface 110, an optical instrument module 120, and a sensors module 130. The user interface 110 includes a viewfinder 112 and an input module 114. The viewfinder 112 may be any component that allows the user to view a picture scene when composing a picture. For example, the viewfinder 112 may be an LCD display on a camera phone. The input module 114 may be any component that allows the user to manipulate the camera 100, such as a key pad or touchscreen. The optical instrument module 120 may include any collection of components used to capture, process, and store a digital image. The optical instrument module 120 may include a central processing unit (CPU) 122, a memory 124, a graphics processing unite (GPU) 126, a camera subsystem 128, and a sensors subsystem 130. The CPU 122 may be any component capable of performing computations and/or other processing related tasks, and the memory 124 may be any component capable of storing programming and/or instructions for the CPU 122. The GPU 126 may be any component or collection of components configured to create an image in a memory buffer for output to a display, e.g., the viewfinder 112, etc. The camera subsystem 128 may include any component or collection of components used to capture a digital image, e.g., electronic sensor, shutter, etc. The sensors module 130 may include any component or collection of components used to detect or monitor a camera position (e.g., location, orientation, etc.) or environmental condition (e.g., lighting, etc.). For example, the sensor module 130 may include a gyroscope and/or accelerometer for detecting an orientation (e.g., yaw, pitch, roll, etc.) of the camera 100, a global positioning system (GPS) for detecting a spatial location of the camera 100, and a metering system (e.g., ambient light sensor) for detecting environmental/lighting information. In some embodiments, the GPS may be a micro or indoor GPS capable of providing precise camera location, e.g., three dimensional coordinate information.

Figure 3:
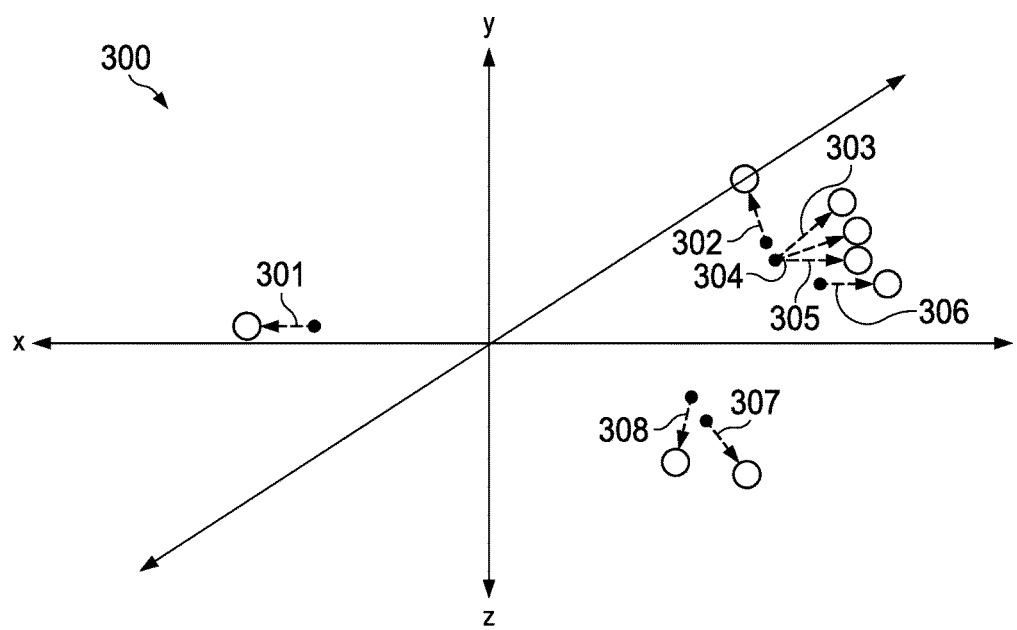
FIG. 3 illustrates a diagram of an activity history map.
Figure 2:
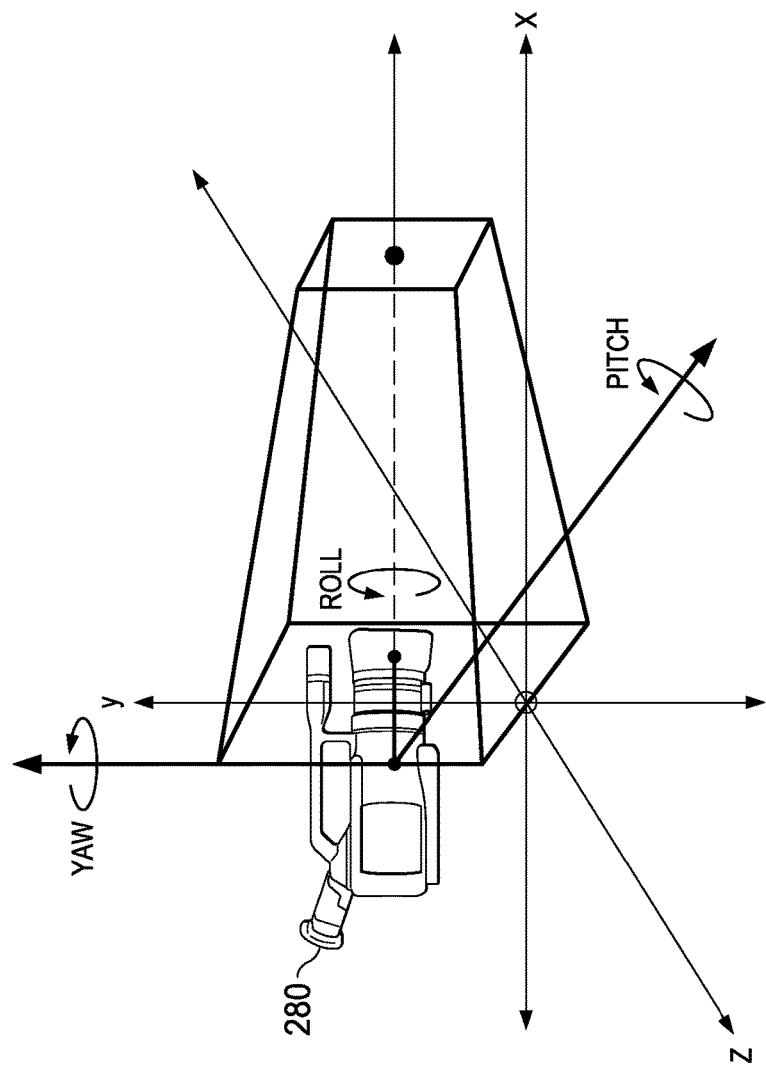
FIG. 2 illustrates a graph of a three dimensional map of camera activity.

FIG. 2 illustrates a graph depicting a position of a camera 280. As shown, the camera 280 has a spatial location (x, y, z) as well as a spatial orientation (roll, yaw, and pitch). The terms roll, yaw, and pitch are used loosely in this disclosure, and may correspond to elemental rotations, e.g., Euler angles ($\alpha$, $\beta$, $\gamma$) about axes of a fixed or rotating coordinate system. In some embodiments, camera positions are associated with digital images in an activity history map stored in a histogram file. FIG. 3. Illustrates an activity history map 300 associating sequence of digital images 301-308 with vectors along a coordinate plane. The point of each vector represents the spatial location (e.g., x, y, z) of the camera when the corresponding digital image was captured, while the arrow head represents the orientation of the camera when the corresponding digital image was captured. For example, the digital images 303-305 were captured in the same (or similar) spatial location, but at different camera orientations.

Figure 4A:
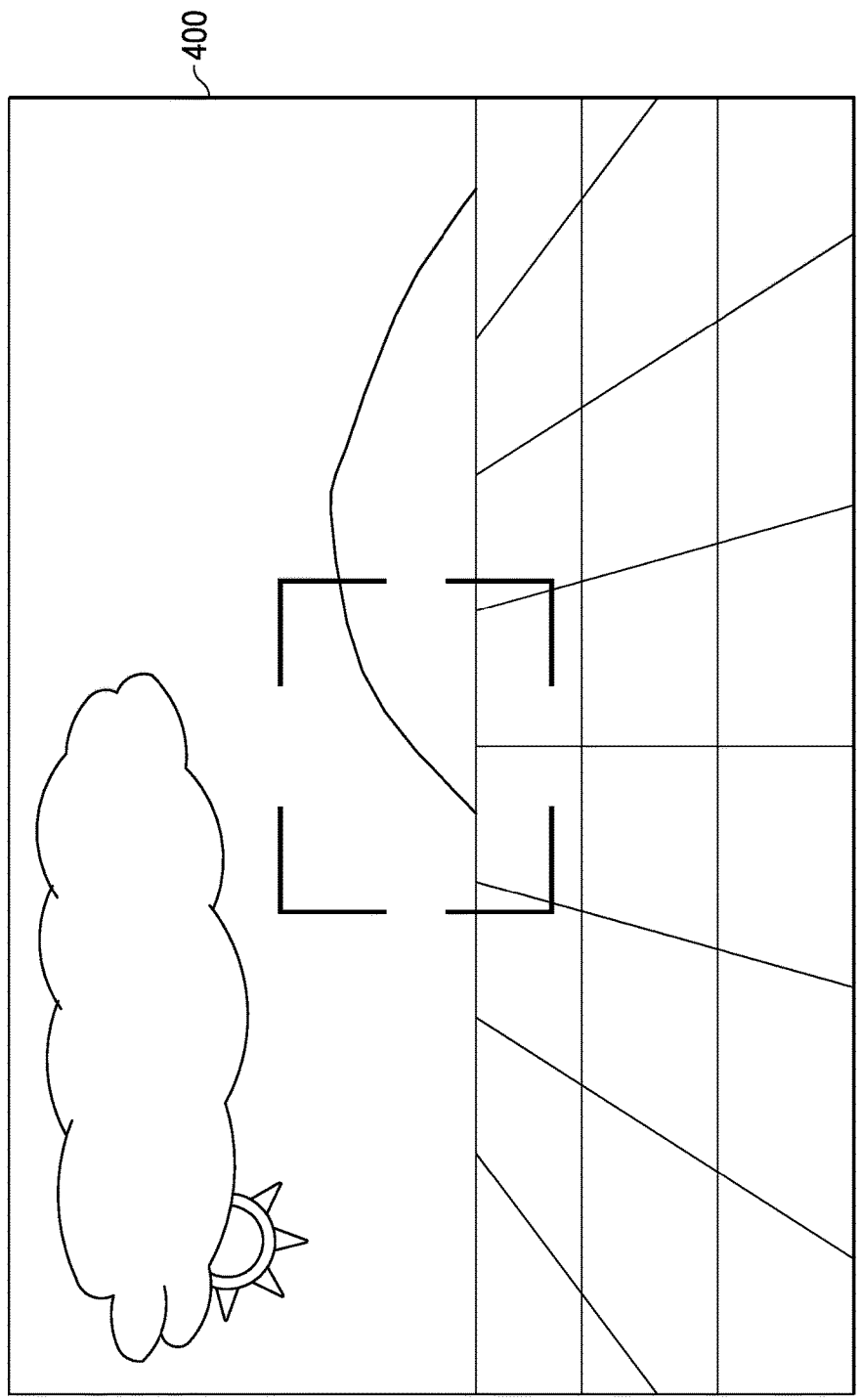
FIGS. 4A-4E illustrate diagrams of embodiment viewfinder images used to guide a user to re-align a camera prior to re-taking a picture.
Figure 4B:
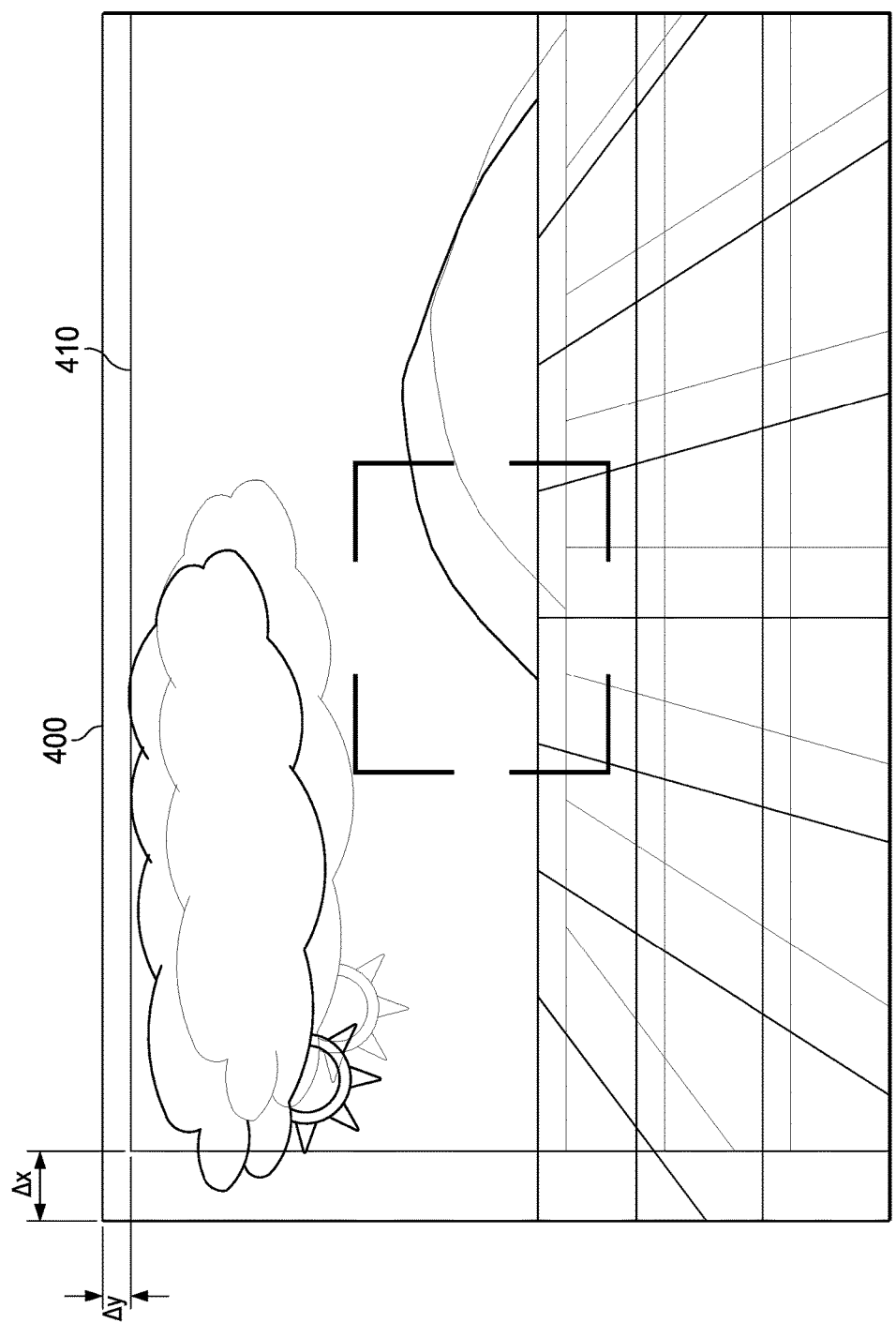
Figure 4C:
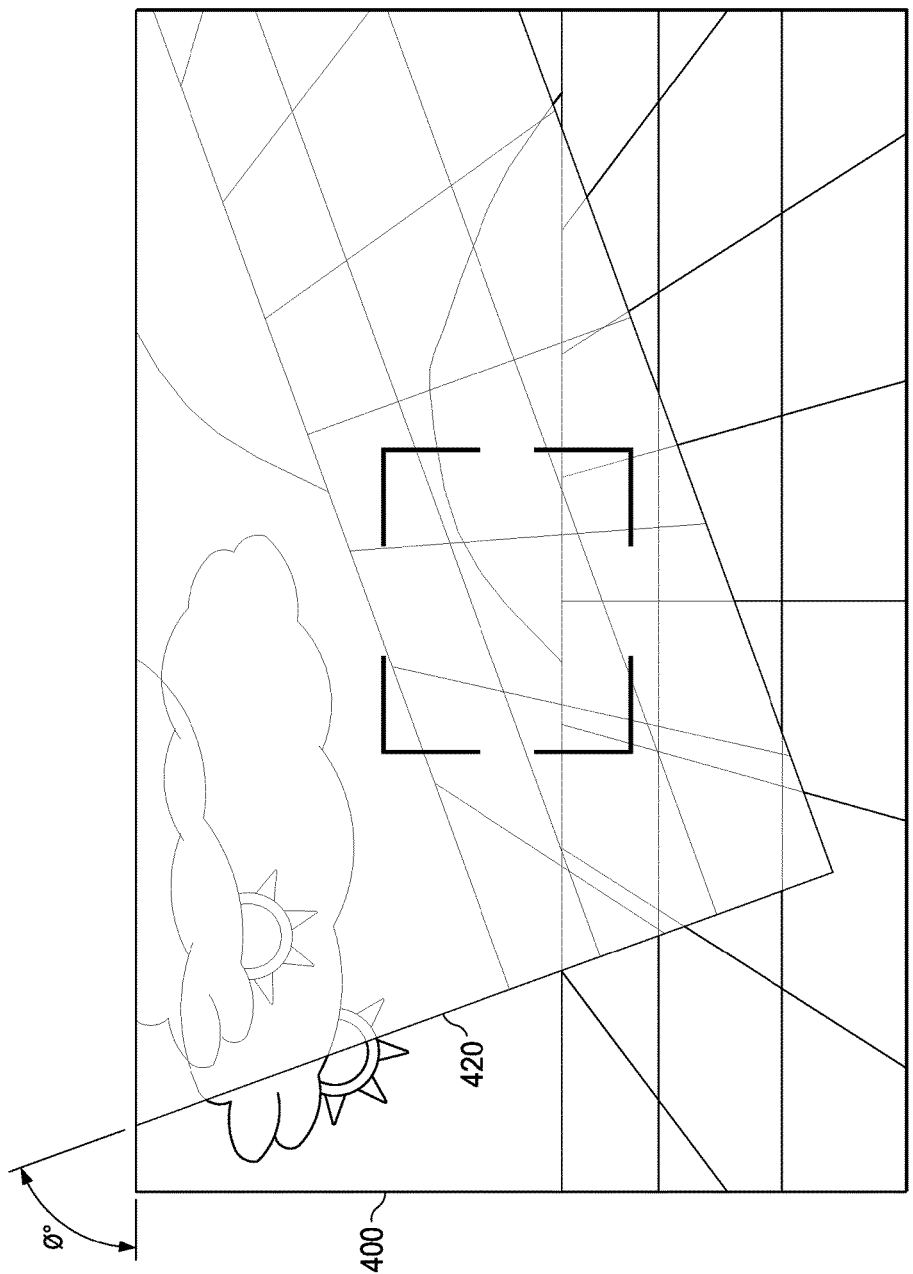

Aspects of this disclosure use augmented reality to display a transparent version of a digital image on the viewfinder of the camera when the camera nears a position from which the digital image was previously captured. FIGS. 4A-4E illustrate how digital images 410-460 are displayed on a viewfinder 400 of a camera using augmented reality. FIG. 4A illustrates a viewfinder 400 of the camera before any images are displayed. FIG. 4B illustrates how a transparent version of a digital image 410 is displayed on the viewfinder 400 as an active position of the camera nears a position associated with the digital image 410 in a histogram file. FIG. 4C illustrates how a transparent version of a digital image 420 is displayed on the viewfinder 400 as an orientation of the camera nears a spatial orientation associated with the digital image 420.

In some embodiments, the camera may include components (e.g., micro GPS, etc.) that are capable of detecting the location and/or orientation of the camera with high precision. In those embodiments, the transparent version of the digital images 410, 420 may move gradually over the viewfinder 400 as the active position of the camera changes in relation to the position stored in the histogram file. For example, a difference or shift (e.g., $\Delta y$, $\Delta x$) between the digital image 410 and a live picture/scene displayed on the viewfinder 400 may decrease as the active location of the camera approaches the location stored in the histogram file. As another example, an angular difference (e.g., $\Delta \theta$) between the digital image 420 and a live picture/scene displayed on the viewfinder 400 may decrease as the active orientation of the camera approaches the orientation associated with the digital image 420 in the histogram file.

Figure 4D:
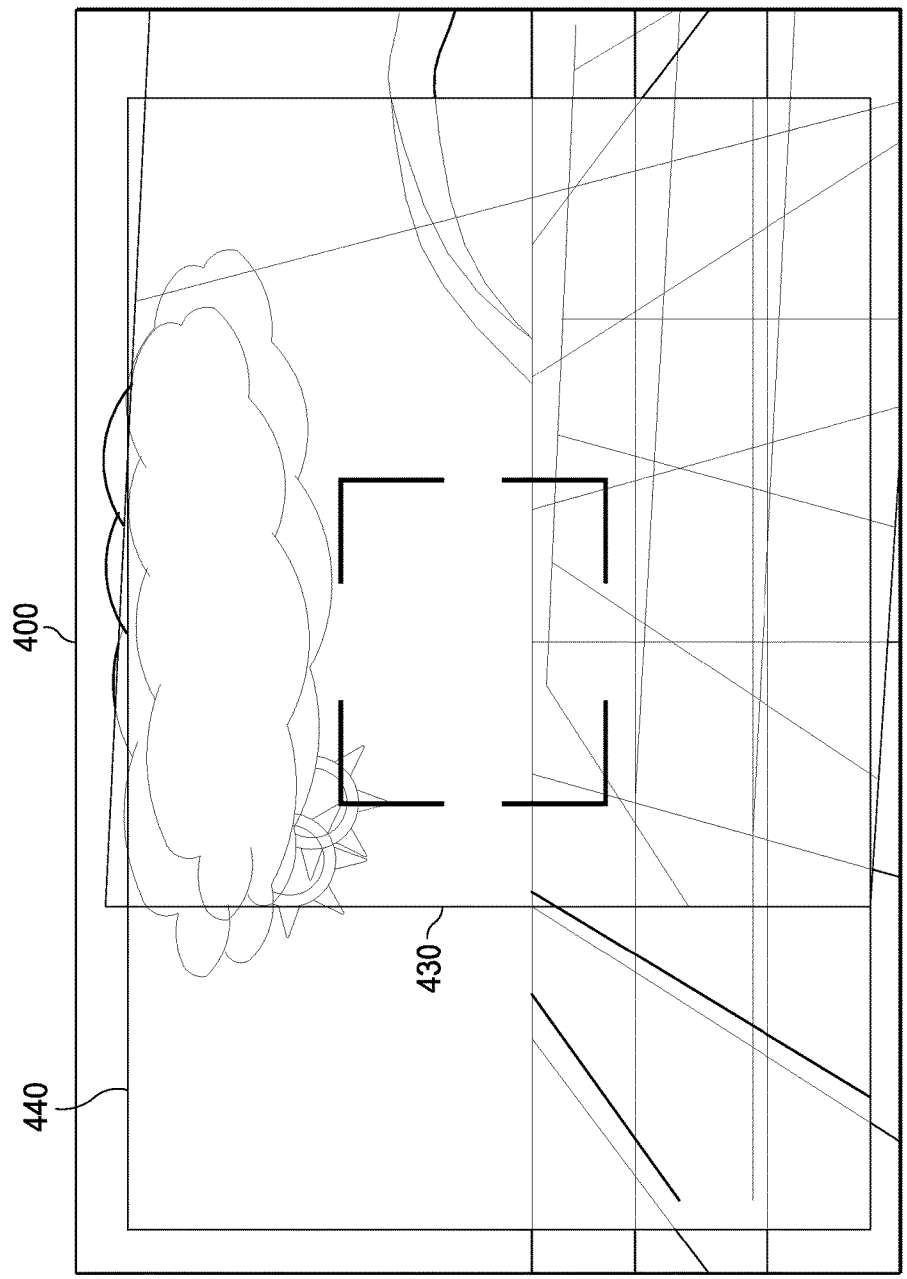
Figure 4E:
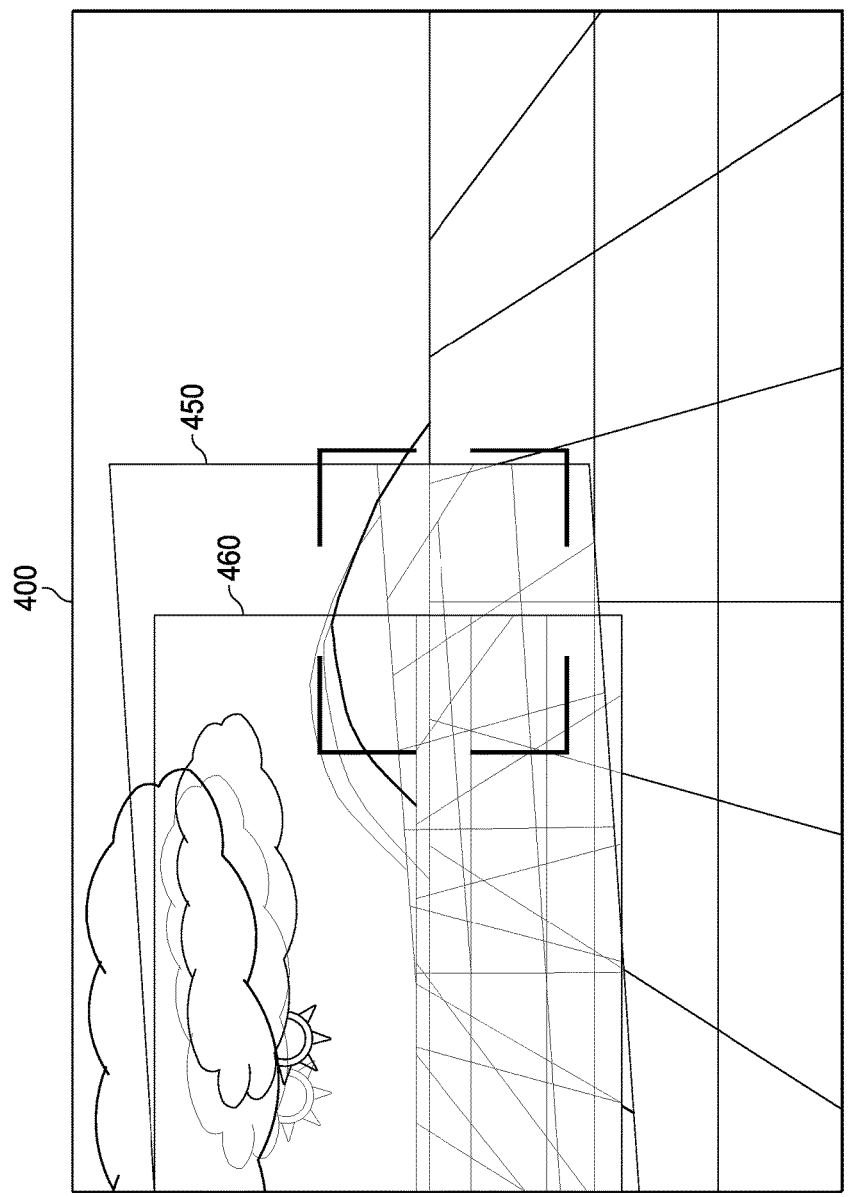

In some embodiments, transparent versions of multiple digital images may be displayed on the viewfinder if the digital images were captured in relatively close proximity to one another. FIG. 4D illustrates how transparent versions of digital images 430, 440 are displayed on the viewfinder 400 as a position of the camera nears positions associated with the digital images 430, 440. As another example, FIG. 4E illustrates how transparent versions of digital images 450, 460 are displayed on the viewfinder 400 as a position of the camera nears positions associated with the digital images 450, 460

Figure 5:
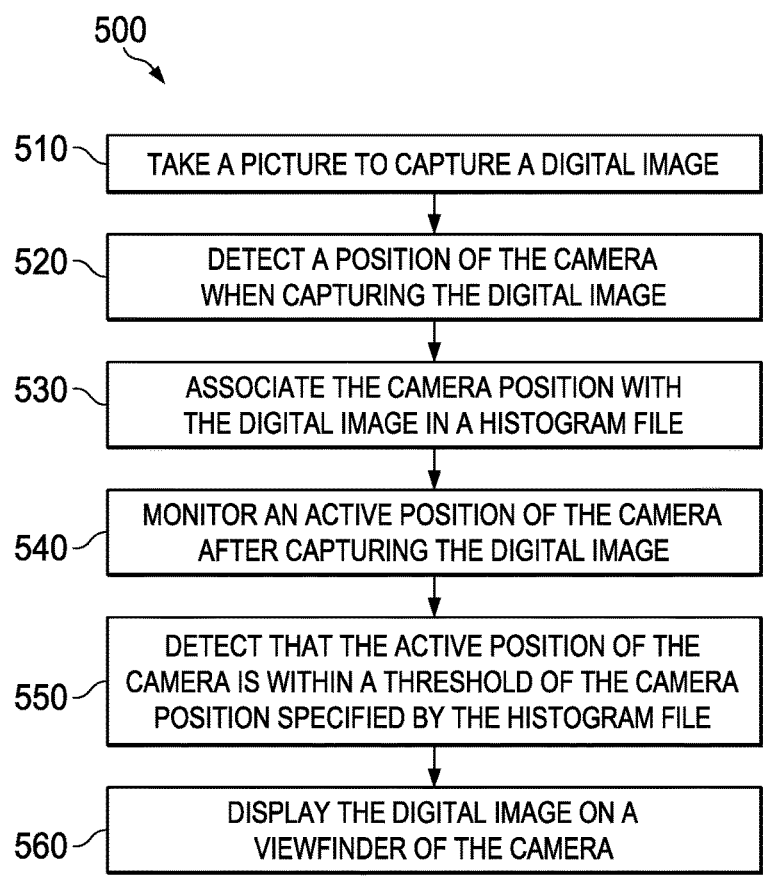
FIG. 5 illustrates a flowchart of an embodiment method for using augmented reality to display a transparent version of a digital image on a viewfinder of a camera as the camera is returned to a position from which the digital image was captured.

FIG. 5 illustrates a method 500 for using augmented reality to display a transparent version of a digital image on a viewfinder of a camera as the camera's position nears a position associated with the digital image. As shown, the method 500 begins with step 510, where the camera takes a picture to capture a digital image. Next, the method 500 proceeds to step 520, where a sensory module detects a position of the camera when capturing the digital image. Thereafter, the method 500 proceeds to step 530, where the detected camera position is associated with the digital image in a histogram file. Subsequently, the method 500 proceeds to step 540, where an active position of the camera is monitored. Next, the method 500 proceeds to step 550, where it is detected that the active position of the camera is within a threshold of the camera position specified by the histogram file. Finally, the method 500 proceeds to step 560, where a transparent version of the digital image is displayed on the viewfinder of the camera.

Aspects of this disclosure also use augmented reality to guide a user to re-configure a camera to correct or avoid image detects in a digital images. For instance, an instruction may be displayed on the viewfinder to reduce the flash or to re-align the camera to avoid a shadow. In embodiments, the instructions may be determined in accordance with a quality analysis of a previous picture or image. As an example, the camera may determine that a defect in a picture (e.g., shadow, etc.) could have been avoided had the camera position been shifted slightly, and thereafter instruct the user to shift the camera when retaking the picture. In other embodiments, a real-time quality analysis may be performed on a picture scene displayed on the viewfinder to avoid the image quality problem before the picture is ever taken.

Figure 6:
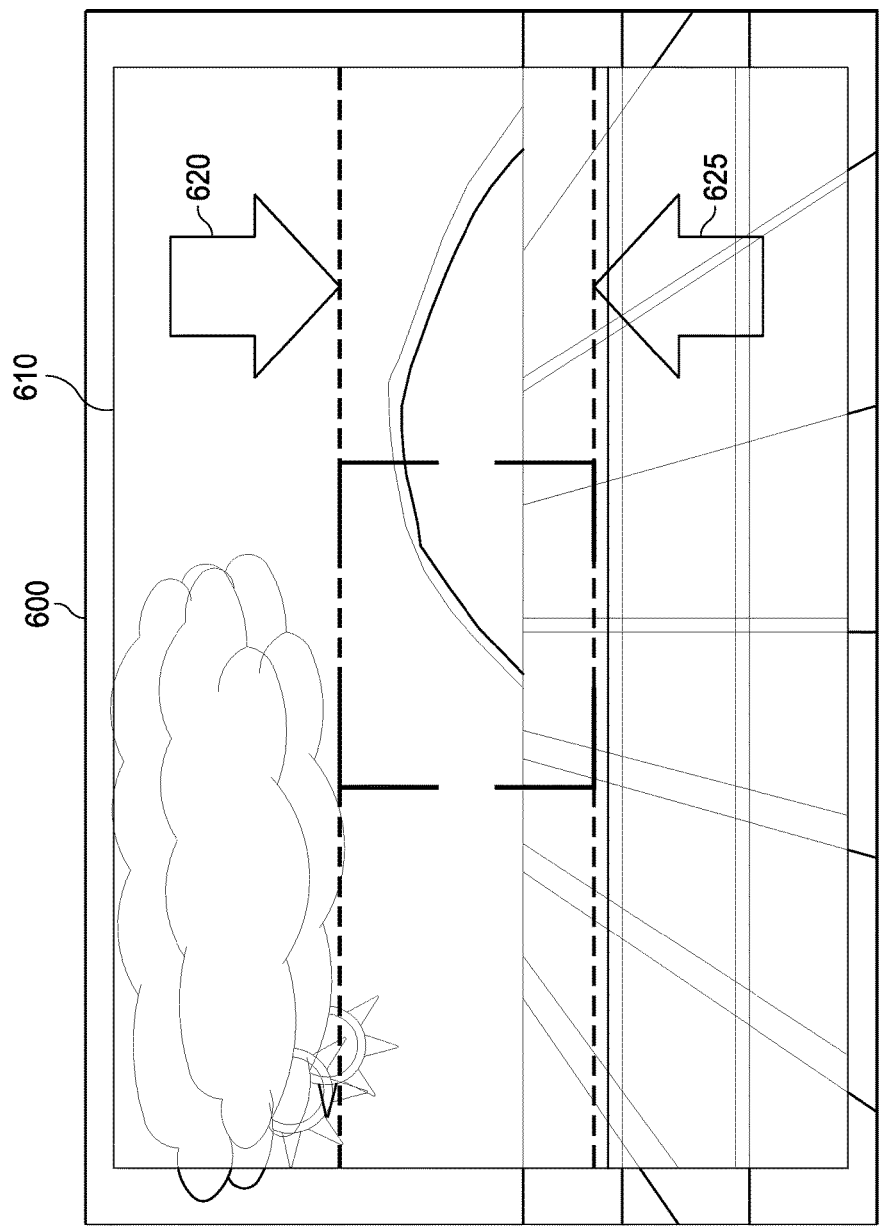
FIG. 6 illustrates a diagram of another embodiment viewfinder image used to guide a user to re-align a camera prior to re-taking a picture via augmented reality.

FIG. 6 illustrates how augmented reality can be used to guide a user in re-aligning a camera. As shown, a transparent version of a digital image 610 is displayed on a viewfinder 600 along with indications 620, 625 that guide the user to re-align a live scene in relation to the digital image 610. In some embodiments, the indications 620, 625 may instruct the user to align the camera to fix an image quality issue in the digital image 610. For example, the indications 620, 625 may instruct the user to align the camera in accordance with the "rule of thirds" so that a horizon is positioned on or around the bottom third of the photo. The rule of thirds is a general image composition principles dictating that a horizon should be aligned at a line bisecting the lower third of the photo from the upper two-thirds. Other image composition principles may be used as a basis for re-aligning the camera, such as principles related to headroom guidance, lead room guidance, diagonal rule guidance, the golden ratio and others.

Figure 7:
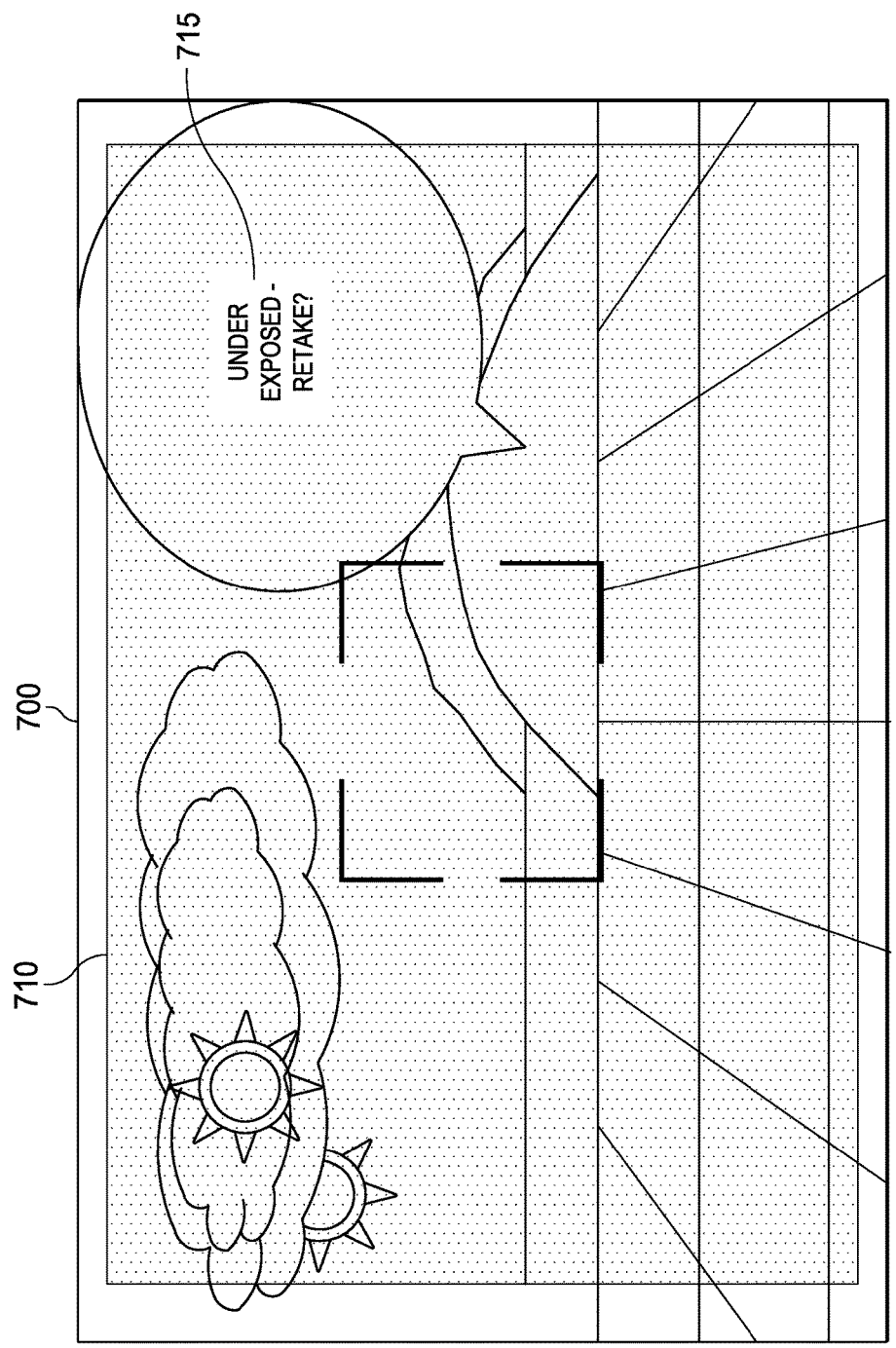
FIG. 7 illustrates a diagram of yet another embodiment viewfinder image used to guide a user to correct an image quality issue via augmented reality.
Figure 8:
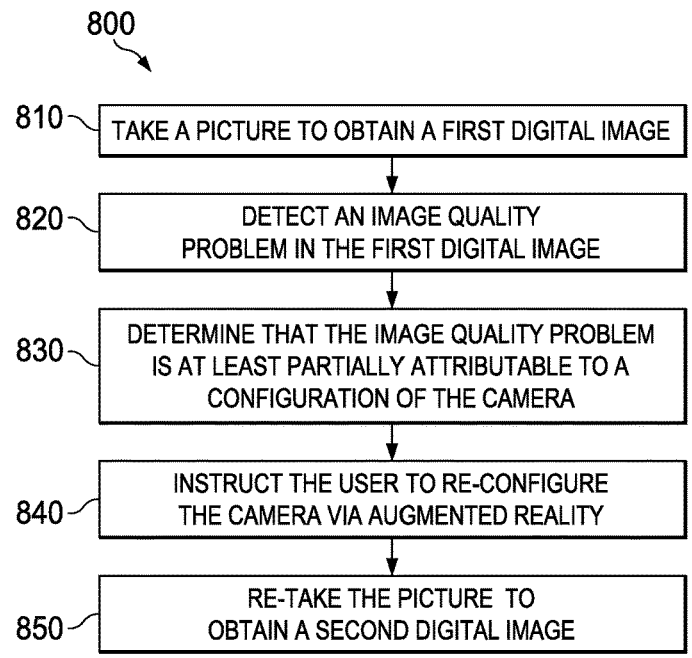
FIG. 8 illustrates a flowchart of an embodiment method for correcting image quality problems via augmented reality.

FIG. 7 illustrates how augmented reality can be used to guide a user in re-configuring a camera. As shown, a transparent version of a digital image 710 is displayed on a viewfinder 700 along with an indication 715 that the digital image 710 was underexposed. The indication 715 could instruct the user to change any camera setting, such as the camera mode information (e.g., M, Av, Tv, P, Auto, Portrait, Macro, Sports, Night, Camera, etc.) aperture/shutter settings, blown out highlights, dominant blacks, and others. FIG. 8 illustrates a method 800 for using augmented reality to guide a user to re-configure a camera to fix an image quality problem in a digital image. As shown, the method 800 begins with step 810, where the camera takes a picture to obtain a first digital image. Next, the method 800 proceeds to step 820, where an image quality problem is detected in the first digital image. Thereafter, the method 800 begins with step 830, where it is determined that the image quality problem is at least partially attributable to configuration of the camera. Next, the method 800 begins with step 840, where the user is instructed via augmented reality to reconfigure the camera to fix or mitigate the image quality problem. Finally, the method 800 proceeds to step 850, where the camera re-takes the picture to obtain a second digital image.

Additional aspects of this disclosure provide an activity history tracking function. The activity tracking function may allow a history of images to be displayed via augmented reality. For instance, a user may take a sequence of pictures at a corresponding sequence of locations, and thereafter view the sequence of pictures via the camera's display while re-visiting the sequence of locations. The activity tracking history function may include a feature for analyzing the quality of previously taken photos. For instance, history can be dynamically analyzed for photo quality, and the results can be depicted using augmented reality.

Figure 9:
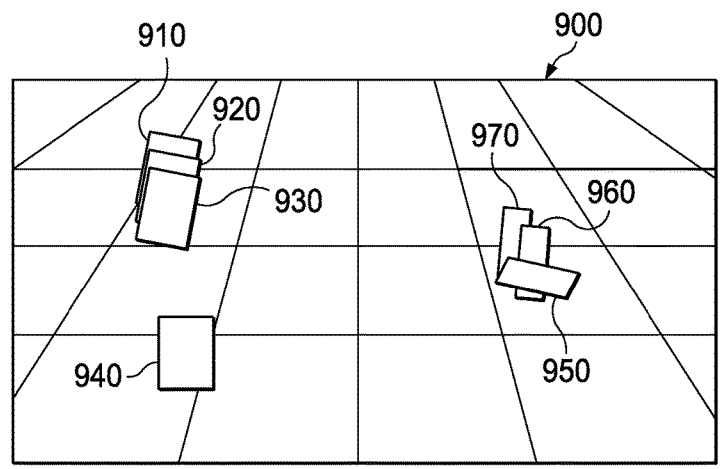
FIG. 9 illustrates a diagram of an embodiment viewfinder image of a histogram file that associates a sequence of locations with a sequence of digital images.
Figure 10:
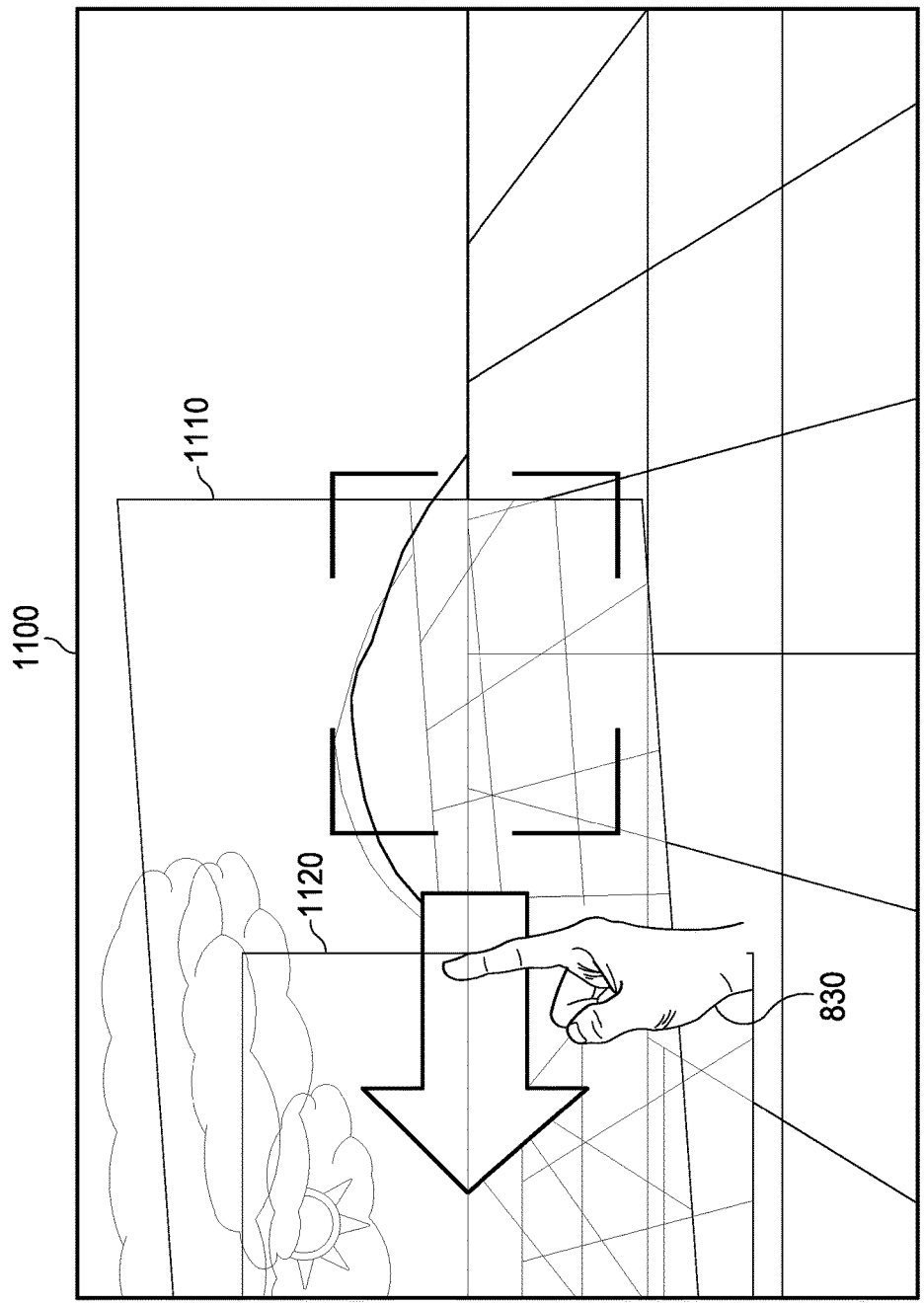
FIG. 10 illustrates a diagram of yet another embodiment viewfinder image that allows a user to cycle through a sequence of digital images.

An activity history map may be used to create a 3D model that the user can view using augmented reality. The model is mapped to a three dimensional perspective projection that is overlaid onto a viewfinder. FIG. 9 illustrates how a 3D model of an activity history map 900 can be overlaid onto a viewfinder. As shown, the sequence of digital images 910-970 are associated with positions on the activity history map. A user may use this 3D rendering as a guide when re-positioning the camera to view a previously captured digital image. For example, the user may move from one location to another to view the images in a sequence. In an embodiment, users may remove the events from the history by swiping the overlay using one or two of their fingers, as shown in FIG. 10.

Figure 11:
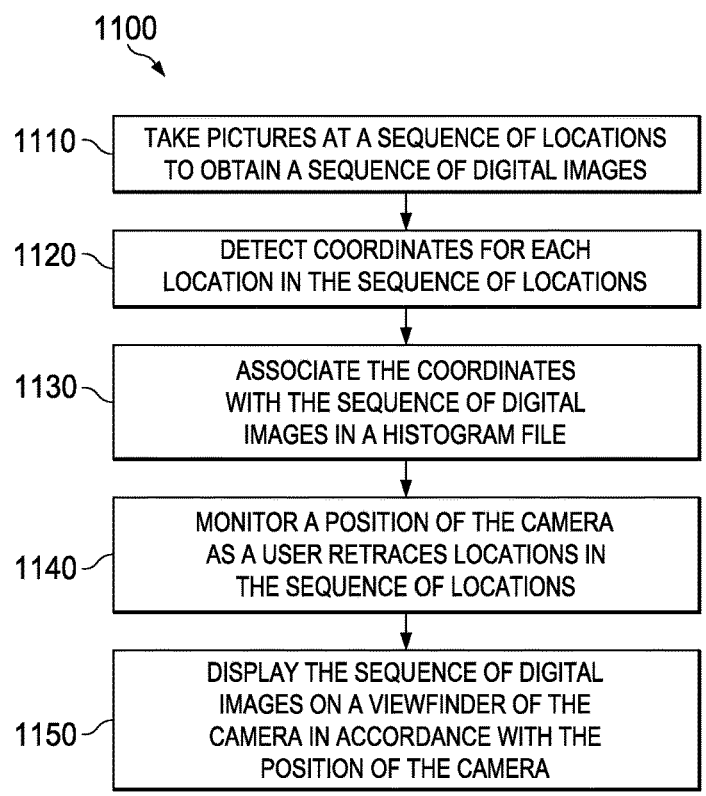
FIG. 11 illustrates a flowchart of an embodiment method for displaying digital images as a user re-traces locations in which those digital images were previously captured.

FIG. 11 illustrates a method 1100 for performing an activity tracking function to allow a history of images to be displayed via augmented reality. As shown, the method 1100 begins at step 1110, where a camera takes pictures at a sequence of location to obtain a sequence of digital images. Thereafter, the method 1100 proceeds to step 1120, where the camera detects coordinates for each location in the sequence of locations. The coordinates may relate to spatial locations and orientations of the camera when the sequence of digital images where captured. Subsequently, the method 1100 proceeds to step 1130, where the camera associates the coordinates with the sequence of digital images in a histogram file. Thereafter, the method 1100 proceeds to step 1140, where the camera monitors a position of the camera as the user retraces locations in the sequence of locations. Next, the method 1100 proceeds to step 1150 where the camera displays the sequence of digital images on a viewfinder of the camera in accordance with the position of the camera.

Aspects of this disclosure display a sequence of digital images in an activity history map via augmented reality. In one example, the user may begin by launching the camera viewfinder with no history, and then capturing an image or video. The history may begin with the first captured image/video. Previously captured images/videos may be overlaid onto viewfinder with transparency as the images are captured. As the camera is pointed in different directions, the overlays appear sequentially on the viewfinder, with newly captured images/videos being added to the history as well as to the augmented reality experience. For instance, a one finger swipe may remove the item at the top of the stack, while a two finger swipe may remove the entire stack.

Aspects of this disclosure provide a next generation camera user interface, which may make the camera more user-friendly. The next generation interface may include an interface for viewing captured history. Further, aspects of this disclosure provide merged gallery playback with camera viewfinder experience. In some embodiments, captured images are displayed immediately in three dimensional space. Aspects of this disclosure may support panorama and photo stitching without changing camera mode.

Figure 12:
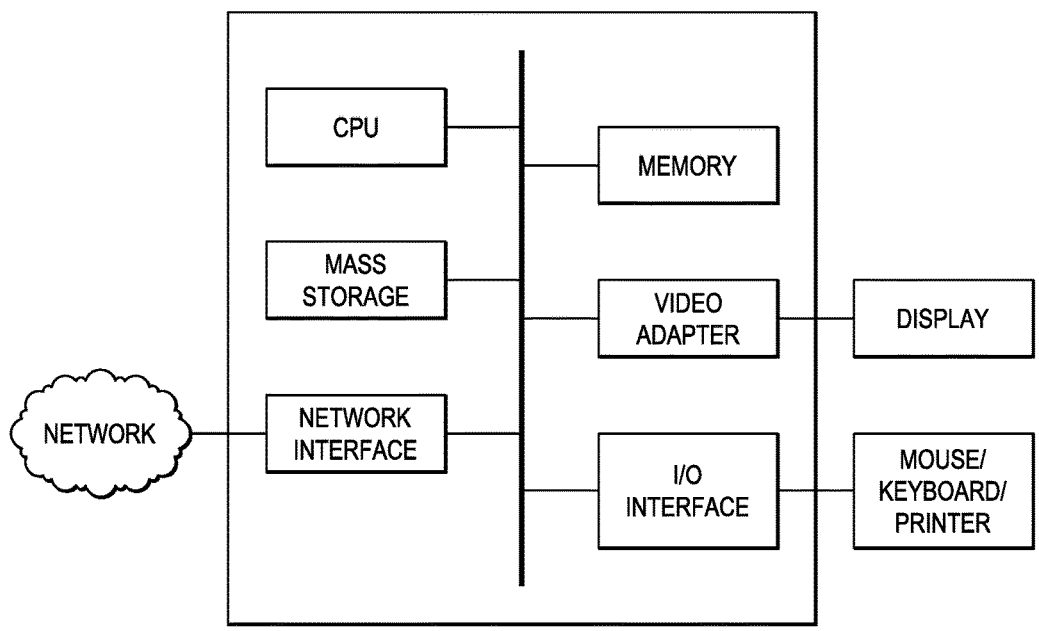
FIG. 12 illustrates an embodiment of a block diagram of a processing system that may be used for implementing the devices and methods disclosed herein.

FIG. 12 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for operating a camera, the method comprising:
   monitoring an active location and an active orientation of the camera; and
   overlaying an at least partially transparent version of a first digital image over a live scene displayed on a viewfinder of the camera upon detecting that the active location of the camera is within a threshold distance of a pre-defined location and the active orientation of the camera is within a threshold angle of a pre-defined orientation.

2. The method of claim 1, wherein the pre-defined location and pre-defined orientation are associated with the first digital image in a histogram file.

3. The method of claim 1, wherein the active orientation includes one or a combination of a yaw, pitch, and roll of the camera.

4. The method of claim 1, wherein the pre-defined location and the pre-defined orientation correspond to a previous location and orientation from which the first digital image was captured.

5. The method of claim 4, further comprising:
   detecting an image quality problem in the first digital image;
   instructing a user to re-configure the camera via augmented reality to at least partially correct the image quality problem; and
   re-taking a picture associated with the first digital image after the user re-configures the camera to obtain a second digital image, wherein the image quality problem is at least partially corrected in the second digital image.

6. The method of claim 5, wherein instructing the user to re-configure the camera via augmented reality comprises:
   displaying an indication on the viewfinder of the camera, the indication guiding the user to re-align the camera prior to re-taking the picture.

7. The method of claim 5, wherein instructing the user to re-configure the camera via augmented reality comprises:
   displaying an instruction on the viewfinder, the instruction prompting the user to adjust a camera setting prior to re-taking the picture.

8. The method of claim 5, wherein instructing the user to re-configure the camera via augmented reality comprises:
   displaying an instruction on the viewfinder, the instruction prompting the user to re-take the picture under different lighting conditions.

9. The method of claim 1, further comprising:
   instructing a user to reconfigure the camera via augmented reality by displaying instructions to re-align the camera relative to the at least partially transparent version of the first digital image.

10. A computer program product comprising a non-transitory computer readable storage medium storing programming, the programming including instructions to:
    monitor an active location and an active orientation of a camera; and
    overlay an at least partially transparent version of a first digital image over a live scene displayed on a viewfinder of the camera upon detecting that the active location of the camera is within a threshold distance of a pre-defined location and the active orientation of the camera is within a threshold angle of a pre-defined orientation.

11. The computer program product of claim 10, wherein the pre-defined location and pre-defined orientation are associated with the first digital image in a histogram file.

12. The computer program product of claim 11, wherein the active orientation includes one or a combination of a yaw, pitch, and roll of the camera.

13. The computer program product of claim 11, wherein the pre-defined location and the pre-defined orientation correspond to a previous location and orientation from which the first digital image was captured.

14. The computer program product of claim 13, wherein the programming further including instructions to:
    detect an image quality problem in the first digital image;
    instruct a user to re-configure the camera via augmented reality to at least partially correct the image quality problem; and
    instruct the user to re-take the picture after the user re-configures the camera to obtain a second digital image, wherein the image quality problem is at least partially corrected in the second digital image.

15. The computer program product of claim 14, wherein the instructions to instruct the user to re-configure the camera via augmented reality include instructions to:
    display an instruction on the viewfinder, the instruction prompting the user to adjust a camera setting prior to re-taking the picture or to re-take the picture under different lighting conditions.

16. The computer program product of claim 10, wherein the programming further includes instructions to:
    instruct a user to reconfigure the camera via augmented reality by displaying instructions to re-align the camera relative to the at least partially transparent version of the first digital image.

17. An electrical apparatus comprising:
- a position sensor configured to monitor an active location and an active orientation of a camera; and
- an electronic viewfinder configured to overlay an at least partially transparent version of a first digital image over a live scene displayed on a viewfinder of the camera upon detecting that the active location of the camera is within a threshold of a pre-defined location and the active orientation of the camera is within a threshold angle of a pre-defined orientation.

18. The electrical apparatus of claim 17, wherein the pre-defined location and pre-defined orientation are associated with the first digital image in a histogram file.

19. The electrical apparatus of claim 17, wherein the active orientation includes one or a combination of a yaw, pitch, and roll of the camera.

20. The electrical apparatus of claim 17, wherein the pre-defined location and the pre-defined orientation correspond to a previous location and orientation from which the first digital image was captured.

* * * * *